United States Patent
Brasile et al.

(10) Patent No.: US 7,878,937 B2
(45) Date of Patent: Feb. 1, 2011

(54) DUAL-PILOT AXLE ASSEMBLY FOR AN AUTOMOTIVE VEHICLE DRIVELINE

(75) Inventors: Francis John Brasile, Lake Orion, MI (US); Ernest Besler, Troy, MI (US); Sarvesh S. Agrawal, Oakland Township, MI (US); Jihong Guo, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 904 days.

(21) Appl. No.: 11/760,997

(22) Filed: Jun. 11, 2007

(65) Prior Publication Data

US 2008/0305910 A1    Dec. 11, 2008

(51) Int. Cl.
*F16H 57/02*    (2006.01)
(52) U.S. Cl. ..................................... 475/230
(58) Field of Classification Search ........... 475/220; 29/893, 893.1
See application file for complete search history.

(56) References Cited

U.S. PATENT DOCUMENTS

| | | | |
|---|---|---|---|
| 3,887,024 A | 6/1975 | Takahashi et al. | |
| 4,701,068 A | 10/1987 | Andrews et al. | |
| 4,856,167 A | 8/1989 | Sabroff et al. | |
| 5,070,745 A | 12/1991 | Lindsey et al. | |
| 5,098,355 A | 3/1992 | Long | |
| 6,544,140 B2 | 4/2003 | Gradu et al. | |
| 6,623,396 B2 | 9/2003 | Szalony et al. | |
| 6,699,154 B2 | 3/2004 | Orr et al. | |
| 6,705,965 B2 | 3/2004 | Sullivan | |
| 2004/0089495 A1 | 5/2004 | Strain | |
| 2004/0192488 A1 | 9/2004 | Prucher | |
| 2005/0085331 A1* | 4/2005 | Prucher | 475/230 |
| 2005/0245342 A1 | 11/2005 | Pontanari et al. | |
| 2008/0227581 A1* | 9/2008 | Catalano et al. | 475/220 |

FOREIGN PATENT DOCUMENTS

| | | |
|---|---|---|
| DE | 4140427 | 2/1993 |
| DE | 10312348 | 10/2004 |
| JP | 2003-056670 | 2/2003 |

OTHER PUBLICATIONS

German Office Action for Appln No. 10 2008 015 918.2-14 dated Dec. 17, 2009.
Search Report under Section 17(5) for GB0809839.4 dated Sep. 29, 2008.

* cited by examiner

*Primary Examiner*—Sherry L Estremsky
*Assistant Examiner*—Edwin A. Young
(74) *Attorney, Agent, or Firm*—Frederick V. Owens; Brooks Kushman P.C.

(57) ABSTRACT

A differential and axle assembly for an automotive vehicle driveline is disclosed. The assembly includes a differential drive pinion and a drive pinion shaft, the drive pinion shaft being splined to a drive pinion shaft flange. Axial and radial dimensional runout is minimized by spaced, front and rear pilot surfaces at axially spaced ends of the splines for the drive pinion shaft and the drive pinion flange.

13 Claims, 4 Drawing Sheets

DUAL-PILOT AXLE ASSEMBLY FOR AN AUTOMOTIVE VEHICLE DRIVELINE

BACKGROUND OF THE INVENTION

1. Field of the Invention

The invention relates to a pinion assembly for differential gearing for an axle in a vehicle driveline.

2. Background Art

A driveline for an automotive vehicle typically comprises a driveshaft that is connected drivably to a geared differential drive pinion, usually a hypoid pinion, which engages a differential ring gear connected to a differential carrier. A differential carrier journals two or more pinions, which in turn drivably engage differential side gears. The side gears are connected to axle shafts for vehicle traction wheels.

The differential drive pinion includes a pinion shaft that is journaled by a pair of axially spaced bearings, usually tapered roller bearings, in a differential housing. A driving connection between an engine driven driveshaft and a drive pinion shaft is achieved by using a universal coupling, which may have constant velocity characteristics if the centerline of the driveshaft is disposed with respect to the centerline of the pinion at an angle greater than a predetermined amount. The universal coupling comprises a flange, including a drive pinion flange in a plane that is perpendicular with respect to the centerline of the drive pinion shaft. The flange includes a flange hub that is internally splined to permit a driving connection between the flange hub and an externally splined portion of the drive pinion shaft. The flange is secured to the drive pinion shaft by a locknut that is threaded on an end of the shaft. Typically, the locknut engages a hub of the flange.

Driveline vibrations often occur due to a so-called "runout" of the drive pinion flange due to radial displacement of the rotational axis of the drive pinion shaft with respect to the center of the universal coupling for the driveshaft. A flange runout may occur also in an axial direction due to flange surface variations, variations in pitch diameter of the drive pinion, variable tolerances of drive pinion shaft bearings and variations in the squareness of other rotary elements of the assembly, such as a washer or "oil slinger" with which the flange is engaged. The axial runout, together with the radial runout of the pinion shaft axis, produce a so-called composite runout, which is a vector sum of radial and axial runout components.

Composite runout can be measured by a master fixture that may be attached to the drive pinion shaft flange prior to final assembly. Other methods, such as a laser measurement technique of the flange itself, also may be used. The laser technique would eliminate machining errors in the master fixture, thus providing a more accurate measurement.

Typically, the drive pinion flange spline is characterized by a high press fit. Spline errors in a typical design can cause the flange to orient itself in a random fashion. An error caused by variations in the spline fit is a major contributor to composite flange runout. The other contributors to composite flange runout are errors measured at the flange face, at a flange pilot and at a flange locknut face, as well as at the flange surface that contacts the locknut face.

SUMMARY OF THE INVENTION

It is an objective of the invention to provide an axle pinion assembly for an automotive driveline wherein a drive pinion shaft spline runout is substantially reduced, thereby avoiding undesirable driveline vibrations. In a typical axle assembly for contemporary vehicles, the drive pinion shaft spline runout will account for a major proportion of the total composite flange runout. Flange face runout and flange pilot diameter runout may account for only about one-third of vehicle warranty problems due to undesirable vibrations. All other tolerance variations in the axle assembly components may account for less than 10% of the undesirable driveline vibrations.

An improvement in vibration characteristics of an automotive driveline is achieved by the present invention by eliminating the effect of spline pitch diameter runout, which is the largest contributing factor to composite flange runout. This is achieved by using a dual-pilot journal design with front and rear pilot surfaces for supporting the flange at the interface of the internal splines of the flange and the external splines of the drive pinion shaft.

Composite flange runout (CFRO) is a method of measurement that quantifies how well the rotational axis of the axle drive pinion assembly conforms to the center of the universal coupling joint of the driveshaft in both the axial and radial directions. Higher values of CFRO for vehicle axle assemblies lead to unacceptable driveshaft imbalance, noise, vibration and harshness (NVH). A conventional design relies on a mounting of the flange splines onto the drive pinion splines. This arrangement can lead to very high values of CFRO where the driveshaft connects to the axle.

The present invention eliminates or reduces as much as possible, the effect of component tolerances on CFRO. Spline runout, as mentioned above, is the largest contributor to CFRO. Radial pilots on either side of the splines that connect the flange to the drive pinion eliminate this spline runout completely.

The dual-pilots and the drive pinion journals are machined at the same time. They provide for a close relationship to the rotational axis of the axle assembly. The radial pilots, rather than the mating surfaces of the components in the assembly, control the radial and axial runouts which may or may not be perpendicular to the component centerline.

The design of the invention also provides for a value for helix angle on the external splines. The spline helix takes up a majority of the side fit clearance, thereby providing a snug fit while allowing the flange spline to engage the pinion spline easily.

The rear pilot surface diameter and the front pilot surface diameter will have a close dimensional fit with flange bore diameters on either side of the spline. The pinion shaft journal diameters that mate with two flange bore diameters have a minimum interference fit so that the bore diameters and the centerline of the pinion shaft will be concentric. The helix will limit a spline tooth side fit clearance, but will not interfere with the assembly of the pilot journals.

A hardened steel, pressed-in spacer is provided between a pinion shaft locknut and the adjacent surface of the flange, which reduces galling during assembly and increases the probability of a uniform locknut load. A tight pilot fit between the pinion gear shaft and the spacer will prevent oil leakage through the spline teeth, thereby eliminating the need for a seal at a locknut face. The spacer allows for economical machining by allowing broaching of the internal spline teeth.

Conventional designs rely merely on the splines themselves to control runout between the drive pinion and the flange, which leads to very high values of CFRO. Conventional designs use one pilot or a top-fit spline. One pilot or a top-fit spline will not afford the stability of the dual-pilot solution. A top fit spline solution, furthermore, requires tighter tolerances and makes the manufacturing process more difficult.

PARTICULAR DESCRIPTION OF AN EMBODIMENT OF THE INVENTION

Figure 1:
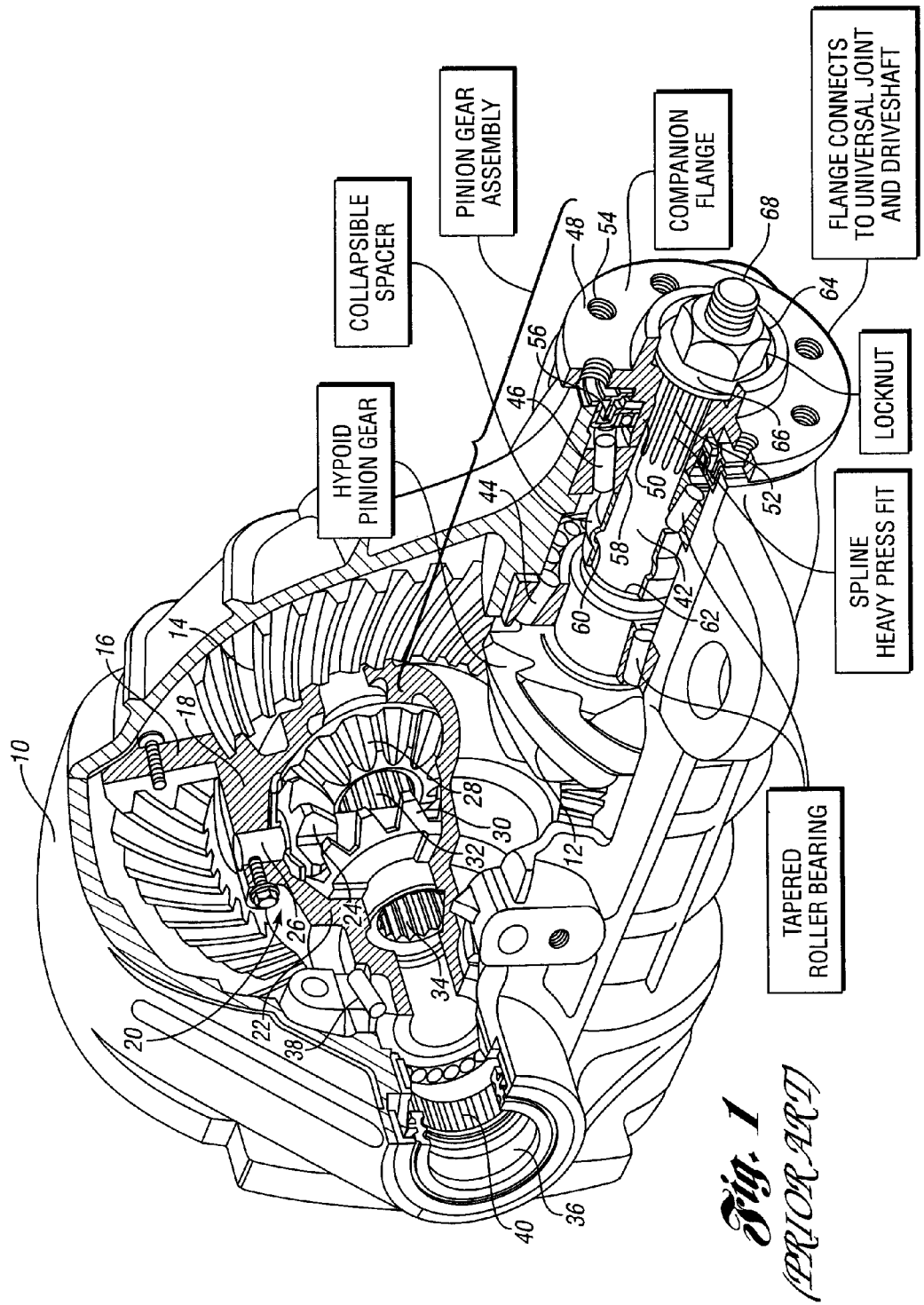
FIG. 1 is an isometric assembly view, partly in section, of a conventional axle assembly for an automotive vehicle driveline.

In FIG. 1, numeral 10 designates a housing of a typical axle assembly. The forward portion of the housing rotatably supports a hypoid drive pinion 12, which meshes with a hypoid ring gear 14 that is secured to a flange 16 on a portion 18 of a carrier 20. A companion portion of the carrier 20, shown at 22, is secured to the portion 18 to define an enclosure for differential pinions, one of which is shown at 24. The pinions are rotatably mounted on pinion shafts 26 supported by the carrier 20.

The differential pinions engage differential side gears 28 and 30. Each side gear is internally splined, as shown at 32 and 34, to establish a driving connection with the splined inner ends of axle shafts that extend through axle shaft openings in the housing 10, one opening being shown at 36. The carrier is end-supported by carrier bearings, one of which is shown at 38. A separate bearing is used for the inner ends of the driveshafts, one of which is shown at 40.

Although the drive pinion 12 and the ring gear 14 disclosed in FIG. 1 are hypoid gears, which make it possible to displace the axis of the hypoid pinion with respect to the axis of the carrier, other axial assembly designs that do not require hypoid gearing could be used in practicing the present invention.

The drive pinion 12 is formed integrally with a drive pinion shaft 42. A pair of tapered roller bearings, shown at 44 and 46, rotatably support the drive pinion shaft 42 in bearing openings formed in the forward end of the housing 10.

A flange 48 has a flange hub 50 with internal spline teeth that engage external spline teeth 52 on the pinion shaft 42. The flange 48 may be provided with threaded openings 54 for permitting a bolted connection with a universal joint that forms a driving connection between the shaft 42 and an engine driven driveshaft, not shown, for the vehicle driveline. A seal 56 is located between the hub 50 and the bearing opening for bearing 46.

The bearing 46 has an inner race 58 that engages a collapsible spacer sleeve 60. The front end of the sleeve 60 engages the race 58, and the rear end of the sleeve engages a shoulder 62 on the pinion shaft 42.

A locknut 64 with a locknut flange or shoulder 66 is threadably connected at 68 to the forward end of the pinion shaft 42. The shoulder engages the flange 48 when the locknut is tightened. As axial loading for the spaced tapered roller bearings 46 is established, the thrust forces are limited by the crush force for which the collapsible spacer 60 is calibrated.

Figures 2, 2A, 2B:
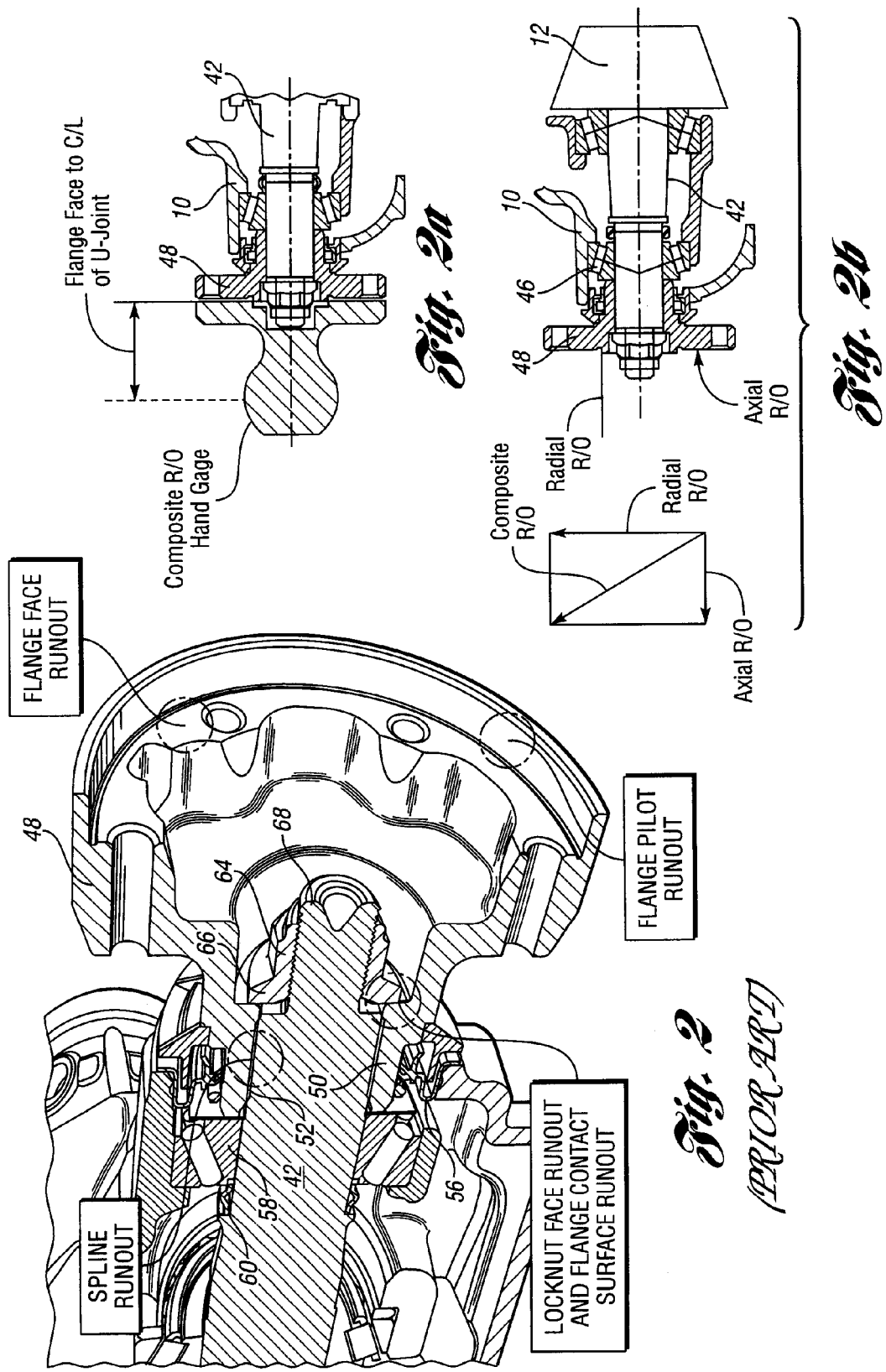
FIG. 2 is a detailed view of the front portion of a conventional axle assembly similar to the assembly shown in FIG. 1.
FIG. 2a shows a portion of a gage for measuring composite runout of a pinion shaft flange.
FIG. 2b is a sketch illustrating radial runout and axial runout of the pinion shaft flange, which are components of the composite runout.

Reference numerals shown in FIG. 2 identify elements common to FIG. 1, where the same numerals are used.

In the conventional design of FIG. 2, the splined connection between the flange and the pinion shaft is made up of two components. The first component is a spline tooth side fit, which is the basic clearance/interface relationship of the external spline teeth and the internal tooth space width. The second component is the interference produced by a small left-hand helix on the external spline. As previously mentioned, the flange is press loaded on the external spline teeth of the pinion shaft. The press loads can exceed 10,000 pounds in a typical conventional application, which can exceed the capacity of the ram of the assembly tool during assembly. This could require the drive pinion locknut to be used to seat the parts, which would be difficult. Further, the press loading of the drive pinion flange may require operator intervention in order to align the parts to find a spline and tooth space orientation needed for the press fit. This may cause a bending moment during the press that could distort the drive pinion gear stem, thereby increasing the composite flange runout.

The conventional design will allow high values for tooth index variations, which results in a higher spline runout. A high index variation may cause fewer spline teeth to be in contact, thereby making it more likely for the flange to become loose or for the pinion locknut to back off during vehicle operation.

Shown in FIG. 2a is a composite hand gage for measuring composite runout, which is the vector sum of radial runout and axial runout. The gage would be secured to the flange face. A measurement tool would contact the surface of the gage as the flange is rotated while the shaft 42 and housing are secured in a test fixture. The measurement tool would record axial runout and radial runout to achieve composite runout data.

Figure 4:
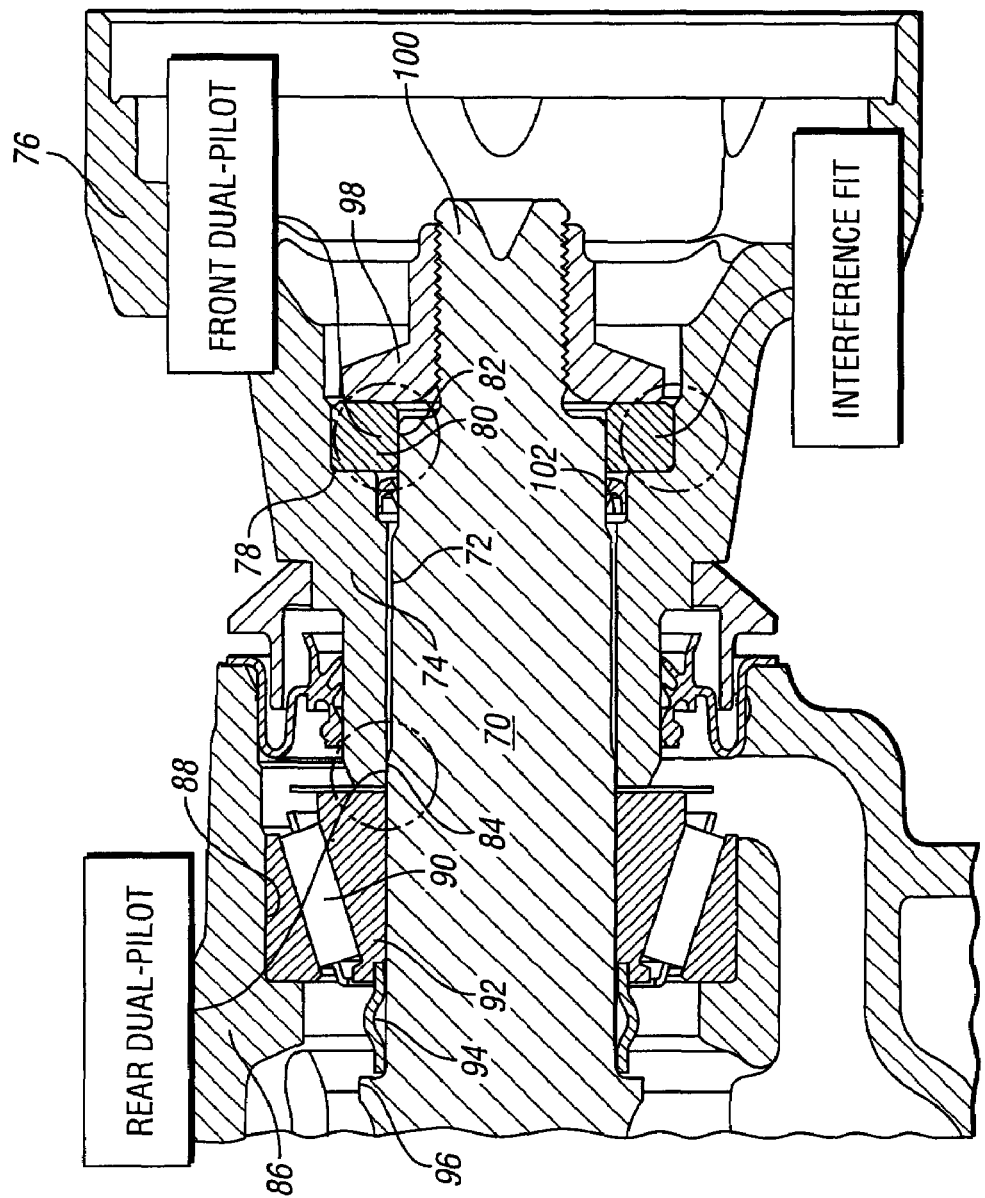
FIG. 4 is a cross-sectional view of a pinion shaft and flange sub-assembly for the design of the present invention.

In contrast to the conventional design of FIG. 2, the present design of FIG. 4 eliminates the effect of the spline pitch diameter runout, which is the largest factor in determining total composite flange runout. In the design of FIG. 4, the pinion shaft, shown at 70, is splined at 72 to the hub 74 of a pinion shaft flange 76. The shaft hub 74 is provided with a spacer opening 78 to receive a hardened steel annular spacer 80. The spacer 80 is press fitted into the opening 78. After it is pressed into the opening, the bore of the spacer 80 is precisely machined, such as by grinding, to provide a pilot surface 82.

A second rear dual-pilot surface 84 is machined in the bore of drive pinion flange hub 74. The internal spline teeth of the hub 74 are located intermediate the pilot surfaces 84 and 82.

The forward end of the axle assembly housing is shown at 86. It is provided with bearing opening 88, which receives a tapered roller bearing 90. The inner race of tapered roller bearing 90, which is shown at 92, engages the forward end of collapsible spacer sleeve 94. A shoulder 96 on the drive pinion shaft is engaged by the rear end of the collapsible sleeve spacer 94.

A locknut 98 is received threadably on the forward end 100 of the drive pinion shaft 70. It engages the front dual-pilot spacer 80. Although a simple oil seal ring 102 may be provided between the flange hub 74 and the pilot shaft, a complex seal assembly capable of accommodating drive pinion shaft vibrations is not required. This is in contrast to the design of FIG. 2, where a so-called "Vibra-seal" is used to prevent oil leakage past the splined connection between the flange hub and the locknut flange 66.

The forward end of the pinion shaft is machined to provide a front pilot surface diameter. The spacer 80, with its precision machined inner diameter, is assembled on the pilot surface 82 with a light press fit. Likewise, the rear pilot surface at 84 for the drive pinion shaft engages the precision machined inner pilot surface of the flange hub with a slight press fit. The external drive pinion shaft spline teeth at 72 have a slight helix angle that limits the spline tooth side fit clearance, but it will not interfere with the assembly of the pilots. The flange hub and the pilot surface on the pinion shaft may be ground.

The drive pinion locknut presses against a harder and more accurate surface of the spacer 80 than the cast flange surface of the design of FIG. 2, which reduces the chance of galling during assembly. The slight press fit between the flange hub 74 and the pilot surface at 82 will automatically prevent oil leakage through the spline.

The external spline teeth of the pinion shaft can be rolled to provide a side fit with a slight helix that accommodates backlash. The internal teeth of the flange hub are broached to provide a side fit spline.

In contrast to the conventional design of FIG. 2, the present invention with its locknut and hardened steel spacer shown in FIG. 4 will encourage a more uniform circumferential locknut load. A high locknut flange runout in the design of FIG. 2 and the mating flange contact surface runout of the design of FIG. 2, contribute to the vibration problems previously described.

The contact forces surrounding the circumference of the locknut in the design of FIG. 2, in contrast to the design of the invention, are not uniform, which results in bending moment deflections. This may elastically distort the end of the drive pinion gear shaft at its threaded end. Also, in the case of the design of FIG. 2, a different value for flange face runout may result depending on where the locknut ends up as it is rotated to its clamping position.

Figure 3A:
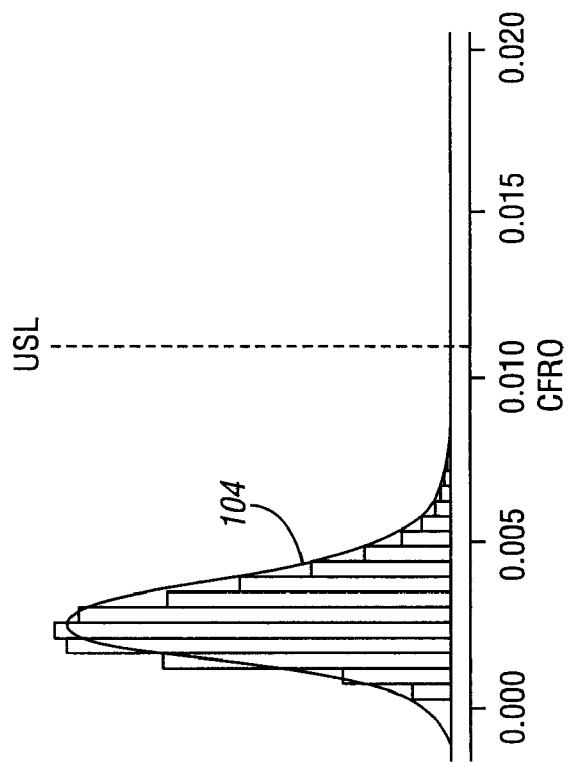
FIG. 3a is a plot, for purposes of comparison with the plot of FIG. 3, showing the composite runout for axle assembly design of the present invention.
Figure 3:
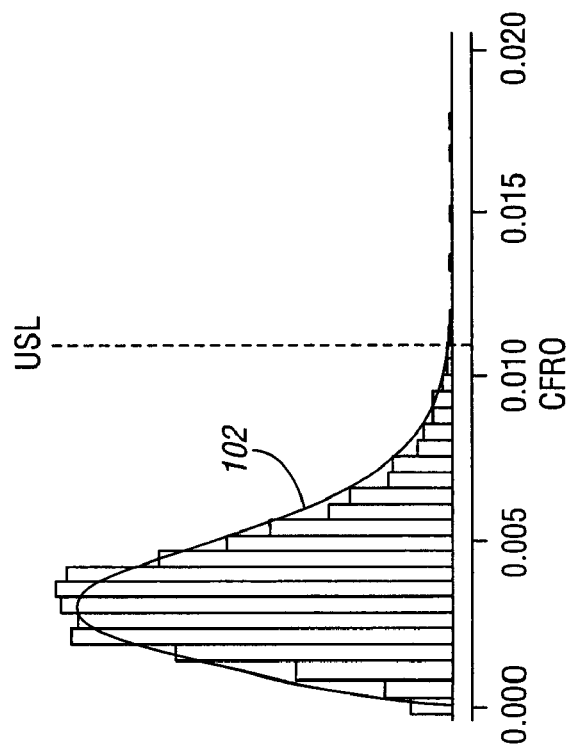
FIG. 3 is a graphic representation of the upper specification limit for test samples with composite flange runout values in a test sampling of a group of axle assemblies manufactured at a high volume axle manufacturing plant using a known axle assembly design.

In FIGS. 3 and 3*a*, the vertical dimension of the ordinate represents the number of axle assemblies in a given sample at various composite runout values. The runout values are plotted along the abscissa. The data measured on a flange for a conventional pinion assembly located within the envelope 102 and the data measured on a flange for the pinion assembly of the present invention are compared in FIGS. 3 and 3*a*, respectively. The improvement in the quality of the axle assembly, with respect to composite flange runout, is apparent by comparing the width of the data plotted within the envelope shown at 102 in FIG. 3 with the data plotted within the envelope 104 in FIG. 3*a*.

Random orientation of the drive pinion shaft flange due to spline errors is eliminated by the present invention. The circumferential load on the flange due to the locknut is distributed more uniformly. The tension and compression forces on the components is improved and the assembly is more stable during vehicle operation.

The pressed-on spacer of the front pilot will allow more economical machining of the flange spline teeth. That is, the teeth can be broached, for example, rather than milled. It also is possible to form the external teeth on the pinion shaft by a simple rolling technique.

The present design will make possible a reduction in manufacturing cost due to its simplified assembly procedure, its simplified machining steps and a reduction in scrap rate. Further, in-plant axle balancing procedures can be eliminated, thus reducing manufacturing costs due to part inspection.

In addition to the foregoing advantages, the invention eliminates a need for high press fit equipment. The light interference fits used in assembling the components of the invention make possible a standard spline side fit for the spline tooth helix.

Although an embodiment of the invention has been disclosed, it will be apparent to a person skilled in the art that modifications may be made without departing from the scope of the invention. All such modifications and equivalents thereof are intended to be covered by the following claims.

What is claimed:

1. A drive pinion assembly for a vehicle driveline comprising a drive pinion and differential gearing enclosed in a differential and axle assembly housing;

the drive pinion drivably engaging a ring gear of the differential gearing;

axle shafts drivably connected to side gears of the differential gearing, the side gears drivably engaging planetary pinions rotatably supported by a carrier of the differential gearing and the ring gear being connected to the carrier;

a drive pinion shaft journaled by front and rear bearings in the differential and axle assembly housing, the drive pinion being fixed on the drive pinion shaft;

a drive pinion shaft flange connected by internal spline teeth engageable with external spline teeth on the drive pinion shaft; and front and rear pilot surfaces on the drive pinion shaft adjacent opposite sides of the external splines whereby the drive pinion shaft flange teeth and the drive pinion shaft spline teeth are aligned with minimal flange runout with respect to a central axis for the drive pinion shaft whereby radial and axial drive pinion shaft flange runout is reduced to a minimum value.

2. The axle pinion assembly for a vehicle driveline as set forth in claim 1, wherein the front pilot surface is disposed within an annular spacer located in a spacer opening in the drive pinion shaft and secured to the drive pinion shaft with an interference press fit.

3. The axle pinion assembly for a vehicle driveline set forth in claim 2, wherein the drive pinion shaft includes a threaded end adjacent the drive pinion shaft flange, and wherein a locknut is threadably connected to the drive pinion shaft threaded end the drive pinion flange is secured to the drive pinion shaft.

4. The axle pinion assembly set forth in claim 3, wherein the spacer includes a precision machined inner pilot surface and the front pilot surface is a precision machined outer pilot surface, the precision machined surfaces being in registry with a slight interference fit.

5. The drive pinion assembly set forth in claim 4, wherein the inner and outer pilot surfaces provide an oil seal that contains lubrication oil within the differential and axle assembly housing.

6. The drive pinion assembly set forth in claim 1, wherein the drive pinion shaft flange includes a hub defining a sleeve surrounding the drive pinion shaft; and a sleeve formed on the drive pinion shaft flange with a precision machined inner pilot surface, the rear pilot surface being precision machined with an outer surface that registers with the precision machined inner pilot surface on the flange sleeve with a slight interference fit.

7. The drive pinion assembly set forth in claim 1, wherein the drive pinion shaft flange spline teeth are formed with a machined spline tooth side fit with internal spline tooth spaces in the drive pinion shaft flange.

8. A method for manufacturing a drive pinion assembly having an axle pinion shaft in a differential and axle assembly housing for a vehicle driveline comprising the steps of:

machining external spline teeth on a drive pinion shaft of the axle pinion assembly;

machining the major diameter of the external spline teeth;

forming internal spline teeth on a drive pinion shaft flange;

machining a major diameter of the internal spline teeth to establish registry with major diameters of the external and internal spline teeth;

forming external front and rear external pilot surfaces on the drive pinion shaft on opposite ends of the external spline teeth with precision tolerances;

forming internal front and rear internal pilot surfaces in the pinion shaft flange with precision tolerances;

assembling the drive pinion shaft in the drive pinion shaft flange with the internal pilot surfaces engaging the external pilot surfaces with a slight interference fit; and securing the drive pinion shaft within the drive pinion shaft flange whereby composite flange runout is minimized.

9. The method set forth in claim 8, wherein the pinion shaft flange includes an annular spacer in a spacer opening in the pinion shaft flange surrounding the pinion shaft; the method including the step of press fitting the annular spacer in the spacer opening, the front pilot surface being precision machined in the spacer opening.

10. The method set forth in claim 9 wherein the step of securing the drive pinion shaft within the drive pinion shaft flange comprises applying a locknut to the drive pinion shaft with a face on the locknut engaging the spacer as the locknut is threaded on the drive pinion shaft.

11. The method set forth in claim 8 wherein the step of forming internal spline teeth on the drive pinion shaft flange comprises a spline tooth broaching operation.

12. The method set forth in claim 8 wherein the step of machining external spline teeth on the drive pinion shaft comprises a spline rolling operation.

13. The method set forth in claim 8 wherein the step of securing the drive pinion shaft within the drive pinion shaft flange comprises applying a clamping force on the flange with a threaded locknut.

* * * * *